(12) United States Patent
Motoi (10) Patent No.: US 12,197,987 B2
(45) Date of Patent: Jan. 14, 2025

(54) LAMINATE, AND CARD BODY AND BOOKLET BODY MANUFACTURED USING SAME

(71) Applicant: Dai Nippon Printing Co., Ltd., Tokyo (JP)

(72) Inventor: Takumi Motoi, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 17/434,545

(22) PCT Filed: Feb. 28, 2019

(86) PCT No.: PCT/JP2019/007816
§ 371 (c)(1),
(2) Date: Aug. 27, 2021

(87) PCT Pub. No.: WO2020/174655
PCT Pub. Date: Sep. 3, 2020

(65) Prior Publication Data
US 2022/0138521 A1 May 5, 2022

(51) Int. Cl.
*G06K 19/02* (2006.01)
*B42D 25/387* (2014.01)
*G06K 19/077* (2006.01)

(52) U.S. Cl.
CPC ..... *G06K 19/07722* (2013.01); *B42D 25/387* (2014.10)

(58) Field of Classification Search
CPC ........... G06K 19/07722; G06K 15/128; G06K 15/1295; B32B 2255/10; B32B 2260/046; B32B 2425/00; G02B 5/22

USPC ........................................ 235/487, 488, 492
See application file for complete search history.

(56) References Cited

U.S. PATENT DOCUMENTS 7,837,823 B2 * 11/2010 Griffin ...................... B65C 9/46
430/338
2017/0157910 A1 * 6/2017 Sumikawa .............. B32B 38/10
2018/0186164 A1 * 7/2018 Wu ....................... B42D 25/435

FOREIGN PATENT DOCUMENTS

| JP | 10287072 | * | 10/1998 | ............. G06K 19/00 |
| JP | 2000047555 | * | 2/2000 | ............. B42D 15/10 |
| JP | 2009-023341 A | | 2/2009 | |
| JP | 2013-001087 A | | 1/2013 | |
| JP | 2013-240885 A | | 12/2013 | |
| WO | 2018/159767 A1 | | 9/2018 | |

OTHER PUBLICATIONS

Office Action mailed Feb. 9, 2024, issued for JP2023-078606 and machine English translation thereof.

* cited by examiner

*Primary Examiner* — Daniel St Cyr
(74) *Attorney, Agent, or Firm* — Locke Lord LLP

(57) ABSTRACT

To provide a laminate which makes it possible to prevent the time deterioration of the thermal transfer image effectively and to enhance the light resistance, and which is used to produce a card body for an ID card and the like and a booklet body such as a data page of a passport. A laminate according to the present invention is characterized by including a front substrate, a laser coloring substrate, a thermal transfer image layer, a white layer, and a back substrate, wherein the laser coloring substrate contains a light resistance improving material.

11 Claims, 6 Drawing Sheets

LAMINATE, AND CARD BODY AND BOOKLET BODY MANUFACTURED USING SAME

BACKGROUND OF THE INVENTION

Field of the Invention

The present invention relates to a laminate and to a card body and a booklet body which are produced using the same.

Background Art

An IDentity (ID) card includes an IC module retention layer containing an integrated circuit (IC) chip, and is used, for example, as an employee's identification card, a student's identification card, or the like to prove the social status of an individual. Recently, a booklet body such as an electronic passport includes a data page containing a contactless IC chip and carrying personal information and a photograph of a person's face.

For example, Patent Literature 1 (JP2013-001087A) discloses an ID card including a front substrate, a front laser coloring substrate, a front white layer, an IC module retention layer, a back white layer, a back laser coloring substrate, and a back substrate, wherein the ID card has a thermal transfer image formed on the surface of the front substrate.

The ID card disclosed in Patent Literature 1 has, for example, a problem in that the thermal transfer image formed on the surface of the front substrate is discolored and faded by the influence of sunlight or the like and deteriorates over time.

CITATION LIST

Patent Literature

Patent Literature 1: JP2013-1087A

SUMMARY OF THE INVENTION

Technical Problem

The present invention has been made in view of the above-mentioned problem, and the problem to be solved is to provide a laminate which makes it possible to prevent the time deterioration of the thermal transfer image effectively and to enhance the light resistance, and which is used to produce a card body for an ID card and the like and a booklet body such as data pages of a passport.

Solution to Problem

A laminate according to the present invention is characterized by including a front substrate, a laser coloring substrate, a thermal transfer image layer, a white layer, and a back substrate, the laser coloring substrate containing a light resistance improving material.

In one embodiment, a fluorescent image layer is provided on the laser coloring substrate side of the front substrate, and the front substrate contains no light resistance improving material.

In one embodiment, a laminate according to the present invention further includes an interlayer containing a polycarbonate-based resin between the thermal transfer image layer and the white layer.

In one embodiment, a laminate according to the present invention further includes an IC module retention layer between the white layer and the back substrate.

A card body according to the present invention is characterized by being produced from the laminate.

A booklet body according to the present invention is characterized by being produced from the laminate.

Advantageous Effects of Invention

A laminate according to the present invention makes it possible to produce a card body for an ID card and the like and a booklet body such as a passport which are able to prevent the time deterioration of a thermal transfer image effectively and enhance the light resistance.

DETAILED DESCRIPTION OF THE INVENTION

<Laminate>

Figure 1:
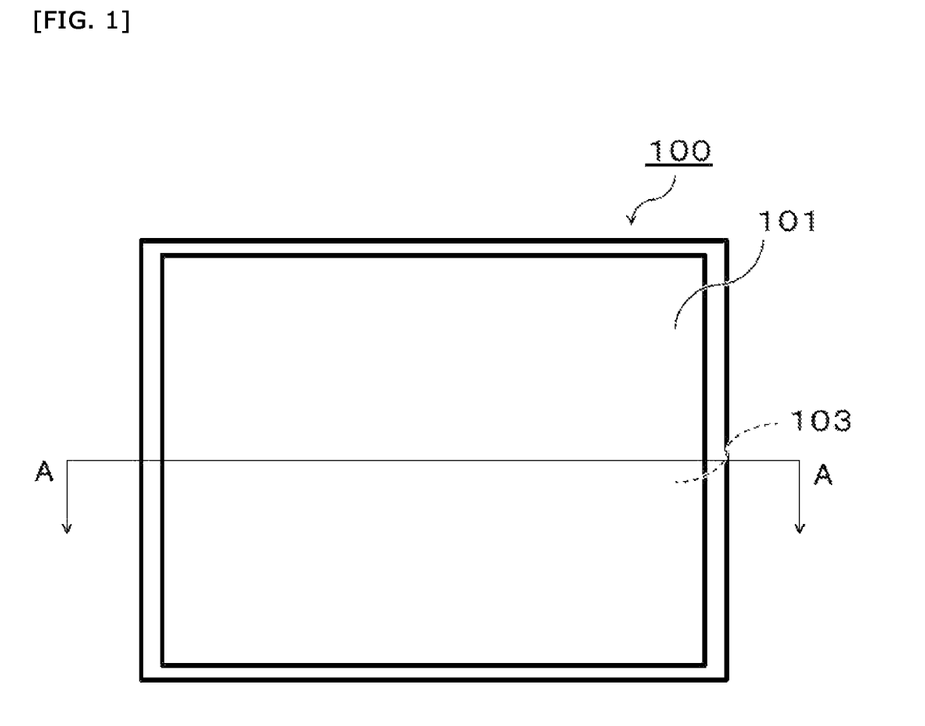
FIG. 1 is a top view of a laminate according to the present invention.
Figure 2:
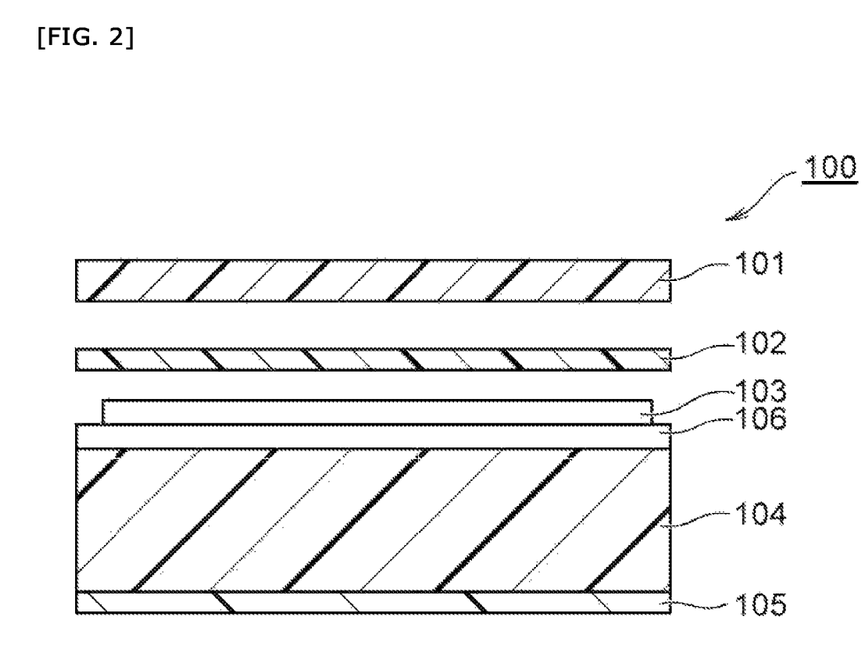
FIG. 2 is a schematic cross-sectional view of the laminate taken along line A-A in FIG. 1.

A laminate 100 according to the present invention includes a front substrate 101, a laser coloring substrate 102, a thermal transfer image layer 103, a white layer 104, and a back substrate 105 as depicted in FIGS. 1 and 2. Here, the laminate 100 is an example depicting the structure of a contactless IC card. FIG. 1 is a top view of the front substrate 101 side of the laminate viewed from the front. FIG. 2 is a cross-sectional view of the laminate cut along line A-A in FIG. 1. The thermal transfer image 103 is not exposed on the surface, and is pointed at by a dashed line.

In one embodiment, the laminate 100 may include an interlayer 106 between the thermal transfer image layer 103 and the white layer 104 as depicted in FIG. 2.

Figure 3:
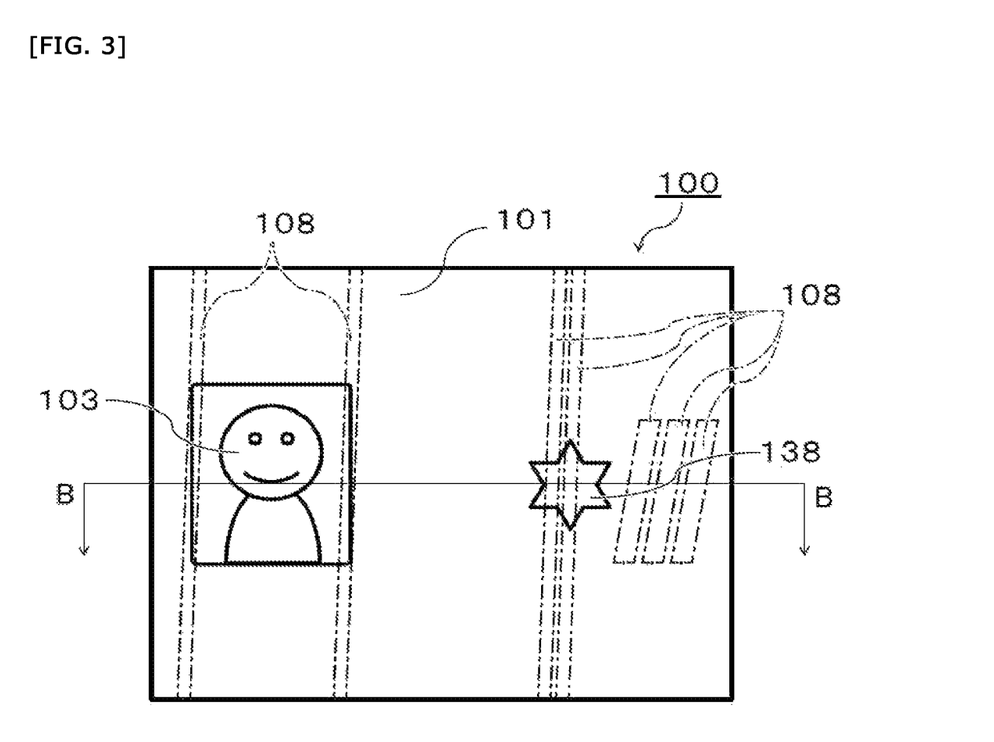
FIG. 3 is a top view of a laminate according to the present invention.
Figure 4:
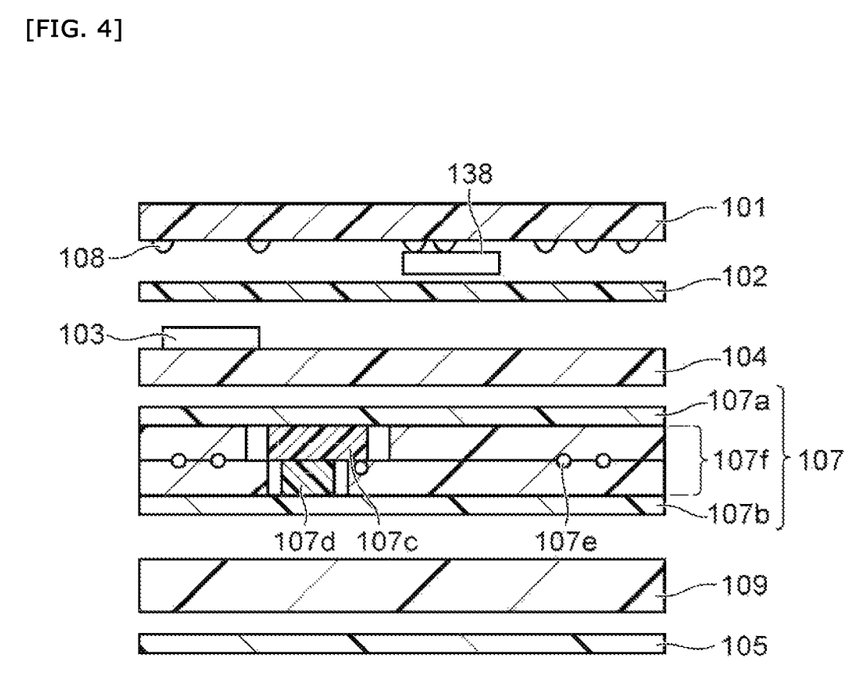
FIG. 4 is a schematic cross-sectional view of the laminate taken along line B-B in FIG. 2.

In one embodiment, the laminate 100 may include an IC module retention layer 107 between the white layer 104 and the back substrate 105 as depicted in FIGS. 3 and 4. FIG. 3 is a top view of the front substrate 101 side viewed from the front. FIG. 4 is a cross-sectional view of the laminate cut along line B-B in FIG. 3.

In one embodiment, the laminate 100 may include a fluorescent image layer 108 on the surface of the laser coloring substrate 102 side of the front substrate 101 as depicted in FIG. 4. The fluorescent ink of the fluorescent image layer 108 usually cannot be observed under visible light, and in FIG. 4, the alternate long and short dash line indicates the ink of the fluorescent image layer to express how the fluorescent image layer 108 is laminated. When irradiated with invisible light such as ultraviolet light, the fluorescent image layer 108 portion depicted by the alternate long and short dash line emits visible light. Allowing the laminate to include the fluorescent image layer 108 makes it possible to verify the light emission by the fluorescent image layer when the front substrate 101 side is irradiated with invisible light such as ultraviolet light, and to prevent counterfeiting of the laminate 100 itself. The fluorescent image layer may have any picture, pattern, shape, and the like.

The laminate 100 according to the present invention may further include a second white layer 109 between the IC module retention layer 107 and the back substrate 105 as depicted in FIG. 4. The white layers 104 and 109 may have ink printed by a known printing method such as off-set printing, wherein the ink is used to print a card face and express a picture, a pattern, a letter, a diagram, a sign, or the like (not shown) on the card face. This makes it possible to check the picture and the pattern when viewing the surface of the laminate. In addition, a hologram image 138 having an optical diffraction structure may be further included between the front substrate 101 and the laser coloring substrate 102. Allowing the laminate to include such a hologram image makes it possible to enhance the counterfeit prevention.

The laminate 100 according to the present invention may include a second laser coloring substrate (not shown) between the back substrate 105 and the second white layer 109.

The laminate 100 according to the present invention may have a hologram image provided between any two layers, for example, between the front substrate 101 and the laser coloring substrate 102. Providing such a hologram makes it possible to prevent counterfeiting of the laminate 100.

Below, each of the layers included in the laminate will be described in detail.

<Front Substrate and Back Substrate>

The front substrate and back substrate can contain a resin material. Examples of resin materials include: polyester-based resins such as polyethylene terephthalate (PET), polybutylene terephthalate (PBT), polyethylene naphthalate (PEN), 1,4-polycyclohexylene dimethylene terephthalate, and terephthalic acid-cyclohexane dimethanol-ethylene glycol copolymers; polyamide-based resins such as nylon 6 and nylon 6,6; polyolefin-based resins such as polyethylene (PE), polypropylene (PP), and polymethylpentene; vinyl-based resins such as polyvinyl chloride, polyvinyl alcohol (PVA), polyvinyl acetate, vinyl chloride-vinyl acetate copolymers, polyvinylbutyral, and polyvinylpyrrolidone (PVP); (meth)acryl-based resins such as polyacrylate, polymethacrylate, and polymethylmetacrylate; polyimide-based resins such as polyimide and polyetherimide; cellulose-based resins such as cellophane, cellulose acetate, nitrocellulose, cellulose acetate propionate (CAP), and cellulose acetate butyrate (CAB); polystyrene-based resins such as polystyrene (PS); polycarbonate-based resins; ionomer-based resins; and the like. Among these, polycarbonate-based resins are preferable, and polycarbonates are more preferable, in terms of transparency and heat-resistance. Polycarbonates are by nature less likely to transmit ultraviolet light (particularly at 365 nm).

In addition, the front substrate and the back substrate can contain an additive such as a filler, plasticizer, antistatic agent, inorganic microparticles, organic microparticles, release agent, or dispersant to the extent that such an additive does not impair the characteristics of the present invention.

In one embodiment, the front substrate is characterized in that a fluorescent image is formed on the surface of the laser coloring substrate side of the front substrate. In this case, the front substrate preferably contains no light resistance improving material. The front substrate containing no light resistance improving material makes it possible to more improve the light emission by the fluorescent image irradiated with fluorescence.

The fluorescent image may be formed on the whole face of the front substrate, or formed on part of the face. In cases where the fluorescent image is formed on part of the face, the image may be formed on two or more separated positions.

This fluorescent image may be formed also on the back substrate.

Without limitation to a fluorescent image, a picture or chromatic, colorless-and-transparent, or colored-and-transparent inks can be printed using a known printing technology such as off-set printing. Adding color to the laser coloring substrate makes it possible to camouflage the position at which the thermal transfer image is formed, and also to serve for counterfeit prevention.

The front substrate and the back substrate can be produced by utilizing a conventionally known method such as an inflation method or a T-die method. The first front substrate and the first back substrate may each be any one of an unstretched film, a uniaxially-stretched film, and a biaxially-stretched film.

<Laser Coloring Substrate>

The laser coloring substrate is characterized by containing the above-mentioned light resistance improving material. The laser coloring substrate containing the light resistance improving material makes it possible to prevent the time deterioration of the thermal transfer image layer provided below the laser coloring substrate.

In cases where the laminate includes the second laser coloring substrate, the second laser coloring substrate optionally contains or does not contain the light resistance improving material.

In the present invention, the laser coloring substrate refers to a layer which contains a laser coloring material and can form a laser image such as a letter or a pattern, wherein the laser coloring material is caused to color by being irradiated with a laser beam.

Examples of laser coloring materials that can be used include: colorants such as dyes and pigments; clays; and the like. More specific examples include carbon, metal compounds such as yellow ferric oxide, inorganic lead compounds, manganese violet, cobalt violet, mercury, cobalt, copper, bismuth, and nickel; pearlescent pigments, silicon compounds, micas, kaolins, silica sand, diatomaceous earth, talc, titanium oxide-covered micas, tin dioxide-covered micas, and antimony-covered micas; and the like.

The laser coloring substrate can contain two or more kinds of laser coloring materials.

The light resistance improving material is not limited to any particular material provided that such a material has an effect which inhibits an image from being discolored or faded by ultraviolet light or visible light, and examples of such materials include hindered amine-based light stabilizers (HALS), ultraviolet absorbers, antioxidant materials, quenching materials, and the like.

Examples of ultraviolet absorbers include benzophenone-based compounds, salicylate-based compounds, benzotriazole-based compounds, cyanoacrylate-based compounds, and metal oxides such as titanium oxide, zinc oxide, selenium oxide, and ceric oxide.

Examples of antioxidant materials include phenol-based compounds such as hindered phenols, chroman-based compounds, coumaran-based compounds, hydroquinone derivatives, benzotriazole-based compounds (having no ultraviolet absorptivity), spiroindane-based compounds, and the like.

Examples of quenching materials include: inorganic metal complexes such as nickel and cobalt; and the like.

The laser coloring substrate can contain the above-mentioned resin material. In addition, a picture or chromatic or colored-and-transparent inks can be printed on one or both of the front face or back face of the laser coloring substrate using a known printing technology such as off-set printing. Adding color to the laser coloring substrate makes it possible to camouflage the position at which the thermal transfer image is formed, and also to serve for counterfeit prevention.

The laser coloring substrate preferably has a thickness of 30 μm or more and 70 μm or less, more preferably 40 μm or more and 60 μm or less.

The laser coloring substrate can be produced using a conventionally known method such as an inflation method or a T-die method, and laminated on the front substrate or the back substrate using a conventionally known adhesive or the like. The laser coloring substrate may each be any one of an unstretched film, a uniaxially-stretched film, and a biaxially-stretched film.

Alternatively, the laser coloring substrate can be formed by dispersing or dissolving the above-mentioned materials in water or a suitable solvent, applying the resulting solution onto the front substrate or the back substrate using a known means such as roll coating, reverse roll coating, gravure coating, reverse gravure coating, bar coating, or rod coating to form a coating film, and drying the coating film.

<Thermal Transfer Image Layer>

A laminate according to the present invention includes a thermal transfer image layer between the laser coloring substrate and the white layer. This thermal transfer image layer makes it possible to form a photograph of a person's face, a pattern, or the like.

The thermal transfer image layer may be provided so as to cover the whole of the white layer or provided so as to cover part thereof. In one embodiment, a laminate according to the present invention includes one or more thermal transfer image layers between the laser coloring substrate and the white layer.

The thermal transfer image layer can be formed by a conventionally known method, and specifically, can be formed using a thermal transfer sheet and a thermal transfer printer.

<White Layer>

A laminate according to the present invention includes a white layer below the laser coloring substrate and the thermal transfer image layer, or on the opposite side thereof from the laser irradiation side. This makes it possible to enhance the visibility of the thermal transfer image layer. Allowing a laminate according to the present invention to include an IC module retention layer can make it difficult to see an IC chip contained in the IC module retention layer, so that the IC ship can be more shielded. A picture or chromatic inks can be printed on both of the front face and back face of the white layer using a known printing technology such as off-set printing. Allowing the laminate to include the IC module retention layer can make it more difficult to see an IC chip contained in the IC module layer, can camouflage the boundary along the formed thermal transfer image layer to prevent counterfeiting, and can make the appearance colorful.

A laminate according to the present invention can include a second white layer between the back substrate and the IC module retention layer.

In one embodiment, the white layer contains a white pigment. Examples of white pigments include titanium dioxide, zirconium dioxide, calcium carbonate, calcium sulfate, zinc oxide, barium sulfate, barium carbonate, silica, alumina, and the like. The white layer can contain two or more kinds of white pigments.

The white layer contains the above-mentioned resin materials.

The white layer preferably has a thickness of 50 μm or more and 200 μm or less, more preferably 80 μm or more and 160 μm or less. Causing the white layer to have a thickness within the above-mentioned value ranges makes it possible to more enhance the visibility of the thermal transfer image layer and the like and to decrease the visibility of an IC chip contained in the IC module retention layer so that the IC chip can be more shielded.

The white layer can be produced using a conventionally known method such as an inflation method or a T-die method, and laminated on the laser coloring substrate using a conventionally known adhesive or the like. The white layer may be any one of an unstretched film, a uniaxially-stretched film, and a biaxially-stretched film.

Alternatively, the white layer can be formed by dispersing or dissolving the above-mentioned materials in water or a suitable solvent, applying the resulting solution onto the laser coloring substrate using a known means such as roll coating, reverse roll coating, gravure coating, reverse gravure coating, bar coating, or rod coating to form a coating film, and drying the coating film.

<Interlayer>

A laminate according to the present invention can include an interlayer 106. According to one embodiment, the interlayer 106 is a layer which may be included between the thermal transfer image layer 103 and the white layer 104. The interlayer 106 is provided in cases where the thermal transfer image 103 cannot be directly formed on the white layer 104 in production steps when the laminate 100 is produced by thermal pressing. The interlayer 106 may be colorless-and-transparent or colored-and-transparent, and may have a chromatic color. Cases where the thermal transfer image 103 cannot be directly formed are cases where ink has been printed on the white layer 104 by off-set printing, silk-screen printing, or the like. If there is no interlayer between the white layer and the thermal transfer image layer in production by thermal pressing, there is a likelihood that the white layer and the thermal transfer image are detached from each other, that the thermal transfer image is distorted, or that the resulting product takes a lower quality form. For this reason, the interlayer 106 may be provided. In a production method which is not carried out using thermal pressing, the interlayer 106 is optionally not provided.

In some cases, applying laser coloring printing lastly to the laminate 100 in which the interlayer 106 is to be provided shows a phenomenon in which heat arising from laser coloring printing reaches the white layer. If no interlayer is provided, the heat is transmitted to the white layer, and in some of the cases where ink is printed on the white layer, the ink is burnt during printing, thus impairing the quality of the resulting product. Accordingly, allowing the laminate to include the interlayer makes it possible to prevent the printed ink from being burnt in cases where the ink is printed on the white layer.

The interlayer can contain the above-mentioned resin materials, and polycarbonate-based resins are preferable in terms of transparency and heat-resistance.

The interlayer preferably has a thickness of 10 μm or more and 100 μm or less, preferably 30 μm or more and 80 μm or less. This makes it possible to enhance the strength of the laminate and, at the same time, maintain the processibility thereof.

<IC Module Retention Layer>

In one embodiment, a laminate 100 according to the present invention includes an IC module retention layer 107, and the IC module retention layer 107 includes a base plate 107a and a base plate 107b, and includes, between these base plates, a resin layer 107f holding a lead frame 107c, a mold 107d having an IC chip enclosed therein, and an antenna 107e.

<Fluorescent Image Layer>

In one embodiment, a fluorescent image layer is provided on the surface of the laser coloring substrate side of the front substrate included in a laminate according to the present invention.

The fluorescent image layer may be provided so as to cover the whole of the front substrate or provided so as to cover part thereof. In one embodiment, a laminate according to the present invention includes one or more fluorescent image layers on the surface of the front substrate.

In the laminate including the fluorescent image layer and the laser coloring substrate having light resistance, a thermal transfer image (for example, a photograph of a person's face) having low light resistance is covered with the laser coloring substrate, and thus, even irradiating the laminate with ultraviolet light to see the fluorescent image does not affect the thermal transfer image with the result that a user holding the laminate can continue to use the laminate for a longer time. This means that the laminate has counterfeit prevention achieved with the laser coloring substrate together with counterfeit prevention achieved with the fluorescent image layer and that it is possible for a long time to identify a person by the thermal transfer image.

The fluorescent image layer can be formed by printing a conventionally known fluorescent ink on the front substrate. In general, a fluorescent ink is colorless-and-transparent under visible light, but may be colored-and-transparent. The fluorescent image layer may be printed using a fluorescent ink reactive with ultraviolet light or an ink reactive with infrared light which is invisible light.

<Method of Producing Laminate>

A method of producing the laminate will be described below with reference to FIG. 5. This production method is only an example and is not limitative.

A laminate production system 110 includes:

a laminated sheet introduction section 112 for forming a laminated sheet 111 including an interlayer, a white layer, an IC module retention layer, and a back substrate, and introducing the laminated sheet;

an intermediate transfer sheet feed section 114 for feeding an intermediate transfer sheet 113, wherein the section 114 is provided downstream in the conveying direction of the laminated sheet 111 from the laminated sheet introduction section 112; and a hot stamp 115 for hot-pressing the intermediate transfer sheet 113.

This heating and warming causes a transfer layer 116 included in the intermediate transfer sheet 113 to be transferred onto the interlayer included in the laminated sheet, so that a thermal transfer image layer 107 can be formed. When this takes place, the heating temperature of the hot stamp 115 is set to, for example, 120° C. or more and 200° C. or less, and the pressure to be applied is set to 0.1 kg/cm² or more and 1000 kg/cm² or less.

More specifically, the intermediate transfer sheet feed section 114 has: an unwinding roll 117a for unwinding the intermediate transfer sheet 113; and a wind-up roll 117b for winding up the intermediate transfer sheet 113.

In addition, the laminate production system 110 includes a laser coloring substrate sheet feed section 118 for laminating a laser coloring substrate 102, wherein the section 118 is provided downstream of the intermediate transfer sheet feed section 114.

This laser coloring substrate sheet feed section 118 has an unwinding roll 120a for unwinding a laser coloring substrate sheet 119, and the laser coloring substrate sheet 119 unwound from the unwinding roll 120a is die-cut on the laminated sheet 111 using die-cutting blades 120b and 120c, and then laminated on the laminated sheet 111 to form the laser coloring substrate 102.

In addition, the laminate production system 110 includes a front substrate sheet feed section 121 for laminating a front substrate 101 on the laser coloring substrate 102, wherein the section 121 is provided downstream of the laser coloring substrate sheet feed section 118.

Figure 5:
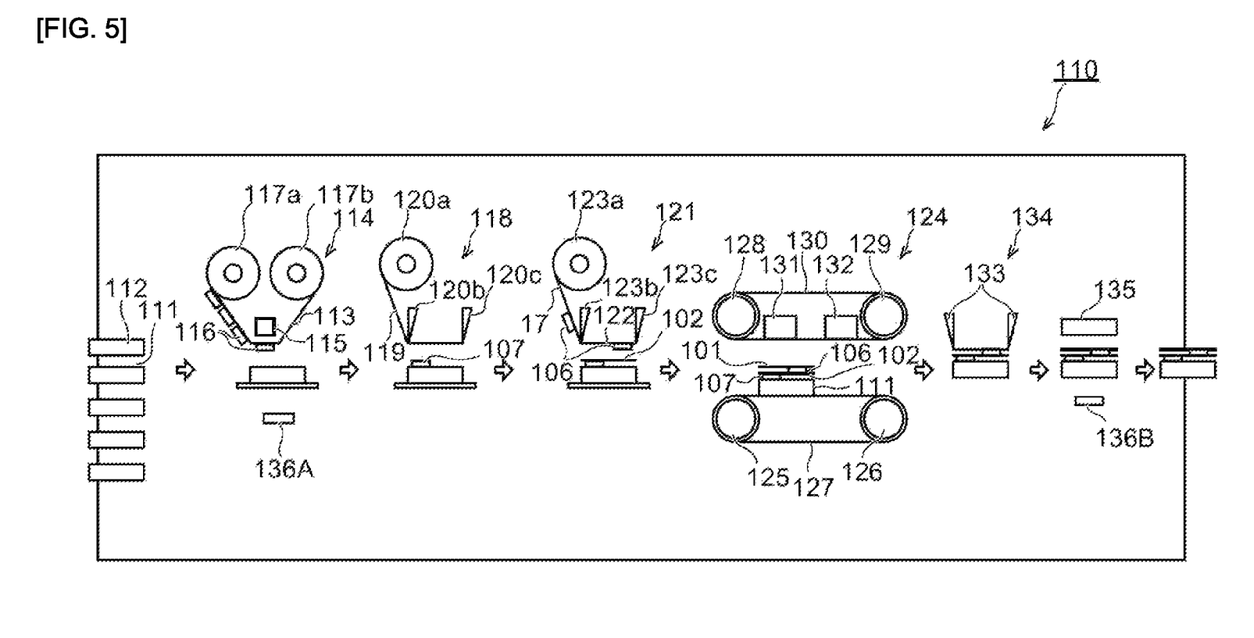
FIG. 5 is a schematic diagram depicting a laminate production system used to produce the laminate.

This front substrate sheet feed section 121 has an unwinding roll 123a for unwinding a front substrate sheet 122 having a fluorescent image 106 formed on the face to be laminated, and the front substrate sheet 122 unwound from the unwinding roll 123a is die-cut on the laminated sheet 111 using die-cutting blades 123b and 123c, and then laminated on the laser coloring substrate 102 (see FIG. 5).

Furthermore, the laminate production system 110 includes, downstream of the front substrate sheet feed section 121, a joining device 124 for hot-pressing the laser coloring substrate 102 and the front substrate 101 against the laminated sheet 111 and joining these tightly.

This joining device 124 includes: a lower conveyor 127 stretched between a pair of lower rollers 125 and 126; and an upper conveyor 130 stretched between a pair of upper rollers 128 and 129. The joining device 124 includes a heating panel 131 and a cooling panel 132 in the upper conveyor 130 side.

Furthermore, the lower conveyor 127 and the upper conveyor 130 each has a pressing plate (not shown) attached thereto, and the laminated sheet 111 sandwiched between the pressing plate of the lower conveyor 127 and the pressing plate of the upper conveyor 130 is conveyed.

After the laser coloring substrate 102 and the front substrate 101 are joined, the outer edge of the laminated sheet 111 is die-cut on a die-cutting unit 134 having die-cutting blades 133 to obtain a laminate 100 according to the present invention.

In addition, the laminate production system 110 includes, downstream of the die-cutting unit 134, a laser light irradiation device 135 for irradiating the laser coloring substrate 102 with laser light to form a laser image.

In addition, the laminate production system 110 includes an IC module write section(s) 136A and/or 136B for writing the personal information of an owner in the IC module retention layer 104 included in the laminated sheet 111.

<Applications>

A laminate according to the present invention can be used as a card body for an IC card, an ID card and the like and can be used for any one of various certificates such as data pages incorporated in a booklet body, for example, a passport.

Figure 6:
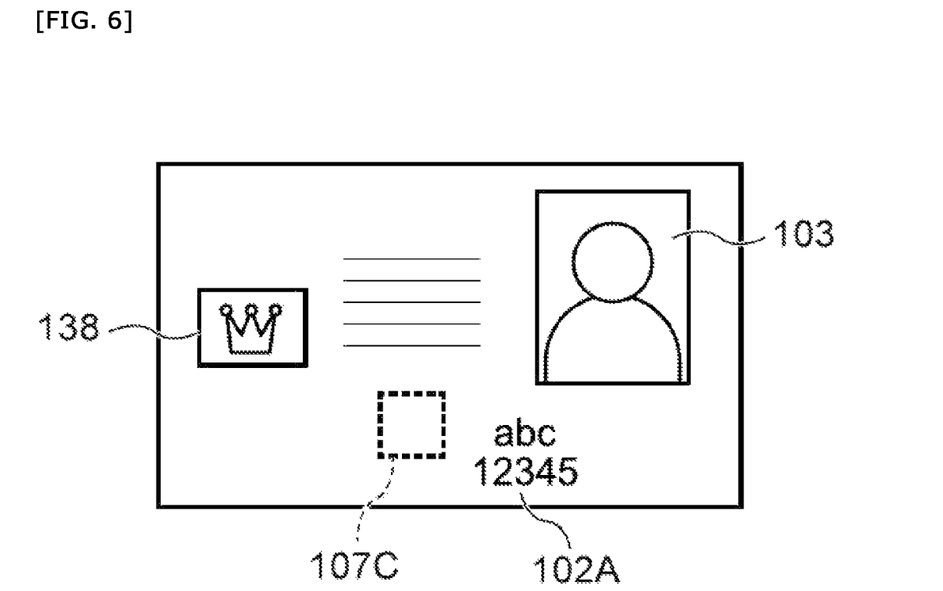
FIG. 6 is a front view of a card body produced using a laminate according to the present invention.
Figure 7:
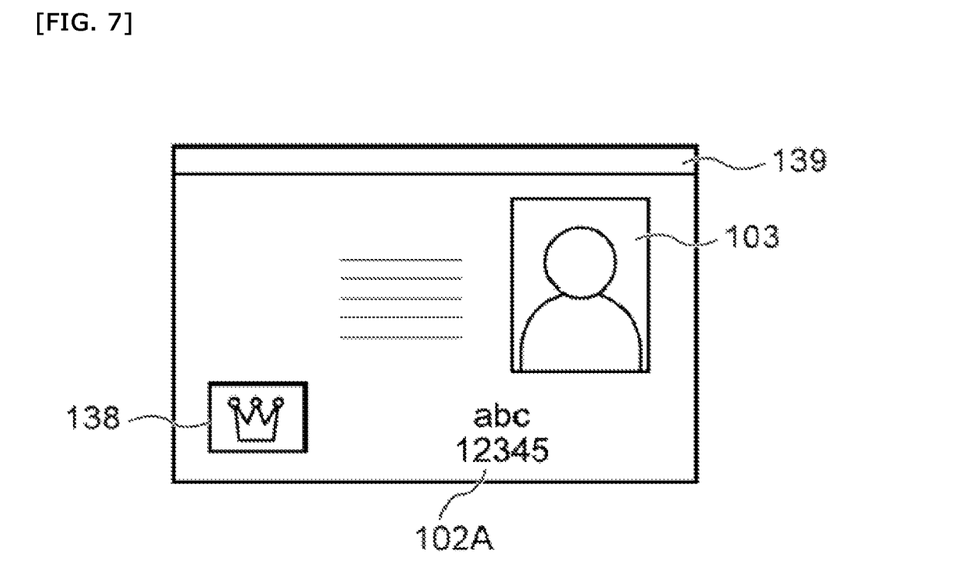
FIG. 7 is a front view of a passport data page produced using a laminate according to the present invention.

For example, a card body or a data page made with a laminate according to the present invention has a thermal transfer image layer in which a photograph of a person's face and the like is formed, as depicted in FIGS. 6 and 7.

In addition, the card body and the data page have a laser image 102A such as letters. Furthermore, the card body has a hologram image 138.

In addition, the card body may have a lead frame 107c embedded therein, as depicted in FIG. 6.

Furthermore, the data page may include a hinge portion 139 which is used to form a booklet body, as depicted in FIG. 7.

EXAMPLES

Next, the present invention will be described in more detail with reference to Examples, and the present invention is not limited to these Examples.

Example 1

A polycarbonate-made film containing a white pigment and having a thickness of 500 μm was provided as a white layer. A transparent polycarbonate-made film having a thickness of 50 μm was laminated as an interlayer on one side of this white layer.

Using a thermal transfer sheet and a thermal transfer printer, a thermal transfer image layer was formed on the opposite side of the interlayer from the white layer side.

A laser coloring substrate (manufactured by Mitsubishi Chemical Corporation) which is transparent and has a thickness of 50 μm was laminated on the interlayer on which the thermal transfer image layer was formed. The laser coloring substrate contains: a polycarbonate as a resin material; carbon as a laser coloring material; and an ultraviolet absorber as a light resistance improving material.

A transparent polycarbonate-made film having a thickness of 105 μm was laminated as a front substrate on the laser coloring substrate.

Furthermore, a transparent polycarbonate-made film having a thickness of 105 μm was laminated as a back substrate on the opposite side of the white layer from the interlayer side to obtain a laminate depicted in FIGS. 1 and 2.

Comparative Example 1

A laminate was produced in the same manner as in Example 1 except that the laser coloring substrate contained no light resistance improving material.

<<Light Resistance Test>>

A light resistance test was carried out on the card in accordance with JIS L0843 (a standard issued on May 20, 2006), the test methods for colour fastness to xenon arc lamp light, in the Japanese Industrial Standards.

A device, Atlas Suntest XLS+ (a tabletop xenon light resistance tester from Toyo Seiki Seisaku-sho, Ltd.), was used. The Atlas Suntest XLS+ included a xenon lamp, which was used at a wavelength of 300 to 400 nm, an irradiation intensity of 50 W/m$^2$, and a black panel temperature of 60° C.

When this was used, the irradiation time and cumulative amount of irradiation which were adjusted by our company as below-mentioned in Table 1 were used as the criteria in order to match the criteria of JIS L0843.

In the below-mentioned Table 1, h means the total irradiation time, and kJ/m$^2$ means a cumulative amount of irradiation. In addition, the BW test cloth means a piece of blue wool (BW) cloth to be used to adjust a test piece in JIS L0843, and was used to ensure correlation between Atlas Suntest XLS+ and JIS L0843. The description from grade 1 to grade 7 of the BW test cloth represents the grade of special cloth which fades to the same degree as represented by the grade of light resistance specified by JIS L0843. In this regard, the light resistance of a photograph of a person's face of a passport is evaluated in accordance with JIS L0843, and it is known that, according to the IC passport standard DOC9303 of ICAO (International Civil Aviation Organization), a product of grade 3 or a higher grade in the JIS L0843 test is judged to be acceptable.

TABLE 1

| Test Results, 300 to 400 nm (50 W/m$^2$) | | | Color Comparison Results of BW Test Cloth (Gray Scale Grade) | | | | | | | |
|---|---|---|---|---|---|---|---|---|---|---|
| | h | kJ/m$^2$ | Grade 1 | Grade 2 | Grade 3 | Grade 4 | Grade 5 | Grade 6 | Grade 7 | Grade 8 |
| Grade 1 | 0.56 | 100 | 4 to 5 | — | — | — | — | — | — | — |
| Grade 2 | 1.78 | 320 | 1 to 2 | 4 to 5 | — | — | — | — | — | — |
| Grade 3 | 8.6 | 1550 | 1 | 2 to 3 | 4 to 5 | — | — | — | — | — |
| Grade 4 | 21.7 | 3900 | >1 | 1 to 2 | 2 to 3 | 4 to 5 | — | — | — | — |
| Grade 5 | 40.0 | 7200 | >1 | >1 | 2 | 4 | 4 to 5 | — | — | — |
| Grade 6 | 61.1 | 11000 | >1 | >1 | 1 to 2 | 4 | 4 | 4 to 5 | — | — |
| Grade 7 | 161.1 | 29000 | >1 | >1 | >1 | 1 to 2 | 2 to 3 | 4 | 4 to 5 | — |

The light resistance of the laminates was evaluated according to the degree of the fading visually observed by a plurality of persons. The evaluation results are listed in Table 2. ○ represents the result that no fading was judged to be found, and × represents the result that some fading was found. Whether fading was found was verified or judged by two persons who carried out observation under a fluorescent lamp. Any piece which either of the two judged to be faded was rated as ×. Table 2 has revealed that the laminate in Example 1 has light resistance of grade 7 or a higher grade. Thus, the thermal transfer image is not affected by ultraviolet irradiation carried out to observe a fluorescent image or the like in the test, and the laminate can continue to be used for a long time.

TABLE 2

| | Example 1 | Comparative Example 1 |
|---|---|---|
| Grade 2 | ○ | ○ |
| Grade 3 | ○ | ○ |
| Grade 4 | ○ | ○ |
| Grade 5 | ○ | ○ |
| Grade 6 | ○ | ○ |
| Grade 7 | ○ | × |

REFERENCE SIGNS LIST

100: Laminate, 101: Front substrate, 102: Laser coloring substrate, 103: Thermal transfer image layer, 104: White layer, 105: Back substrate, 106: Interlayer, 107: IC module retention layer, 107*a* and 107*b*: Base plate, 107*c*: Lead frame, 107*d*: Mold having IC chip enclosed therein, 107*e*: Antenna, 107*f*: Resin layer, 105: Back substrate, 106: Thermal transfer image, 108: Fluorescent image layer, 109: Second white layer, 110: Laminate production system, 111: Laminated sheet, 112: Laminated sheet introduction section, 113: Intermediate transfer sheet, 114: Intermediate transfer sheet feed section, 115: Hot stamp, 116: Transfer layer, 117*a*: Unwinding roll, 117*b*: Wind-up roll, 118: Laser coloring substrate sheet feed section, 119: Laser coloring substrate sheet, 120*a*: Unwinding roll, 120*b* and 120*c*: Die-cutting blade, 121: Front substrate sheet feed section, 122: Front substrate sheet, 123*a*: Unwinding roll, 123*b* and 123*c*: Die-cutting blade, 124: Joining device, 125 and 126: Lower roller, 127: Lower conveyor, 128 and 129: Upper roller, 130: Upper conveyor, 131: Heating panel, 132: Cooling panel, 133: Die-cutting blade, 134: Die-cutting unit, 135: Laser light irradiation device, 136A and 136B: IC module write section, 137: Laser image, 138: Hologram image, 139: Hinge portion.

The invention claimed is:

1. A laminate comprising a front substrate, a laser coloring substrate, a thermal transfer image layer, a white layer, and a back substrate, the laser coloring substrate containing a light resistance improving material and a laser coloring material,
    wherein the light resistance improving material comprises an ultraviolet absorber, and
    the laser coloring material develops black color by a laser irradiation to the laser coloring substrate, and
    the ultraviolet absorber is at least one of selected from the group consisting of a benzophenone-based compound, a salicylate-based compound, a benzotriazole-based compound, a cyanoacrylate-based compound, a titanium oxide, a zinc oxide, a selenium oxide, and a ceric oxide.

2. The laminate according to claim 1, wherein a fluorescent image layer is provided on the laser coloring substrate side of the front substrate, and the front substrate contains no light resistance improving material.

3. The laminate according to claim 1, further comprising an interlayer containing a polycarbonate-based resin between the thermal transfer image layer and the white layer.

4. The laminate according to claim 1, further comprising an IC module retention layer between the white layer and the back substrate.

5. A card body produced from a laminate comprising a front substrate, a laser coloring substrate, a thermal transfer image layer, a white layer, and a back substrate, the laser coloring substrate containing a light resistance improving material and a laser coloring material,
    wherein the light resistance improving material comprises an ultraviolet absorber, and
    the laser coloring material develops black color by a laser irradiation to the laser coloring substrate, and
    the ultraviolet absorber is at least one of selected from the group consisting of a benzophenone-based compound, a salicylate-based compound, a benzotriazole-based compound, a cyanoacrylate-based compound, a titanium oxide, a zinc oxide, a selenium oxide, and a ceric oxide.

6. A booklet body produced from a laminate comprising a front substrate, a laser coloring substrate, a thermal transfer image layer, a white layer, and a back substrate, the laser coloring substrate containing a light resistance improving material and a laser coloring material,
    wherein the light resistance improving material comprises an ultraviolet absorber, and
    the laser coloring material develops black color by a laser irradiation to the laser coloring substrate, and
    the ultraviolet absorber is at least one of selected from the group consisting of a benzophenone-based compound, a salicylate-based compound, a benzotriazole-based compound, a cyanoacrylate-based compound, a titanium oxide, a zinc oxide, a selenium oxide, and a ceric oxide.

7. The laminate according to claim 2, further comprising an interlayer containing a polycarbonate-based resin between the thermal transfer image layer and the white layer.

8. The laminate according to claim 2, further comprising an IC module retention layer between the white layer and the back substrate.

9. The laminate according to claim 3, further comprising an IC module retention layer between the white layer and the back substrate.

10. The laminate according to claim 7, further comprising an IC module retention layer between the white layer and the back substrate.

11. The laminate according to claim 1, wherein the laser coloring material comprises a carbon.

* * * * *